Feb. 20, 1951
J. LIMBERGER
2,542,541
METER BEARING
Filed May 15, 1946
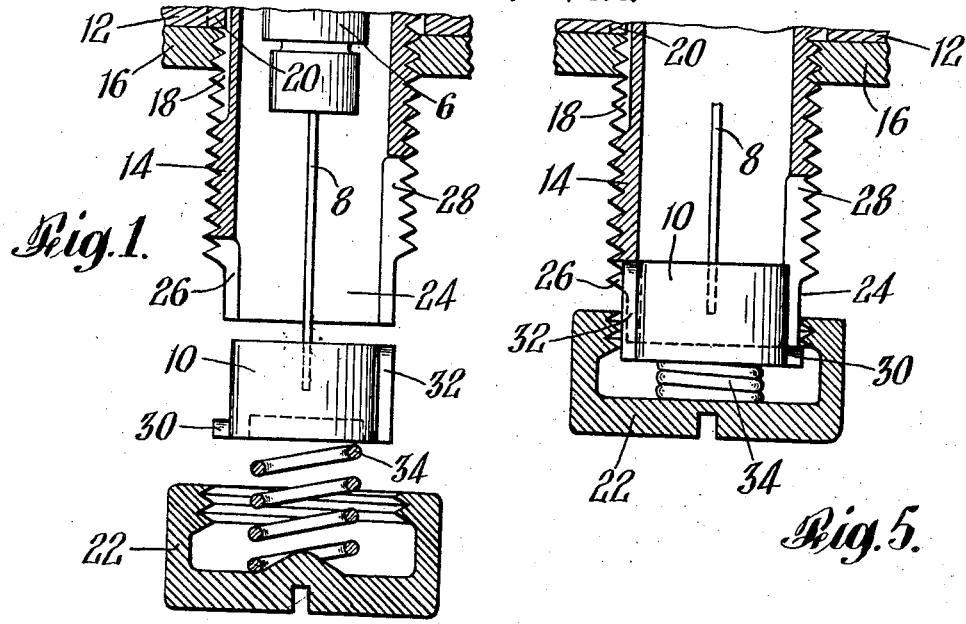
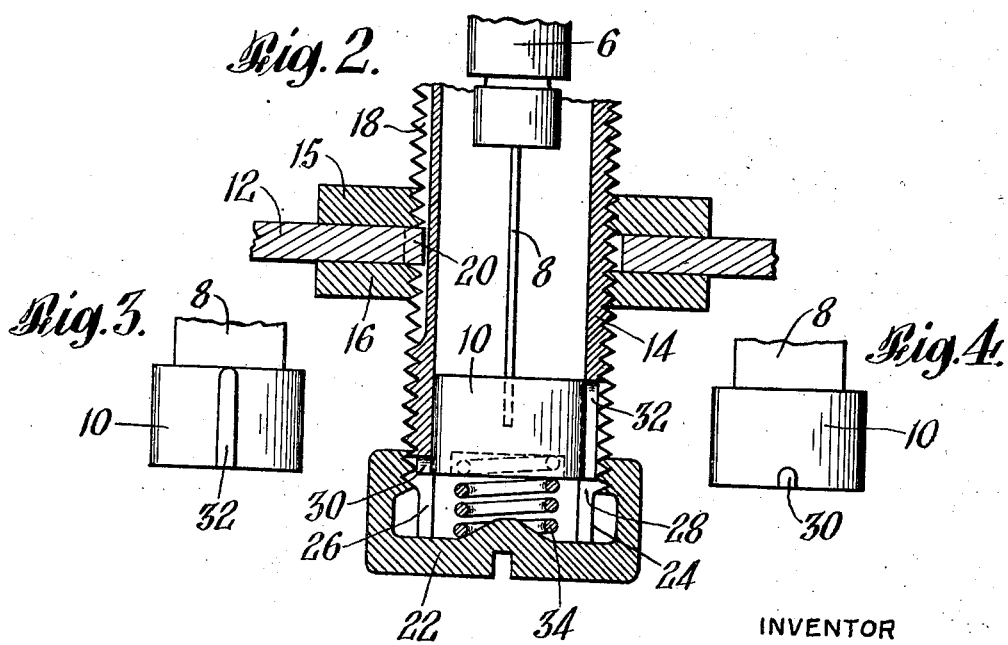
INVENTOR
Josef Limberger.
BY Morgan Finnegan and Durham
ATTORNEYS Patented Feb. 20, 1951

2,542,541

UNITED STATES PATENT OFFICE 2,542,541

METER BEARING

Josef Limberger, Zug, Switzerland, assignor to Landis & Gyr, A. G., a body corporate of Switzerland Application May 15, 1946, Serial No. 669,921
In Switzerland June 2, 1945

4 Claims. (Cl. 308—2)

The present invention relates to electricity meters and more particularly to new and useful improvements of electricity meter bearings.

Objects and advantages of the invention will be set forth in part hereinafter and in part will be obvious herefrom, the same being realized and attained by means of the instrumentalities and combinations pointed out in the appended claims.

The invention consists in the novel parts, constructions, arrangements, combinations and improvements herein shown and described.

The accompanying drawing referred to herein and constituting a part hereof, illustrates one embodiment of the invention, and together with the description, serves to explain the principles of the invention.

Of the drawing:

Figure 1 is a fragmentary, exploded view, partly in section, of an electricity meter embodying the invention applied to the cup part of the bottom bearing and its mount;

Figure 2 is a similar fragmentary view partly in section showing the parts in their assembled relationship;

Figure 3 is a fragmentary view in side elevation of a detail shown in Figure 2;

Figure 4 is a reverse view of the detail shown in Figure 3; and

Figure 5 is a fragmentary view partly in section showing the parts of the bearing in improper and therefore incomplete assembly.

Objects of the invention are to eliminate or damp the humming noises in electricity meters and to this end to provide controlled and predetermined, directed, resilient movement of the meter spindle bottom bearing; to provide a bottom support for the meter disc spindle permitting resilient movement in a predetermined direction while preventing motion of the said supports in other directions; to provide a bottom support which precludes movement in the direction of the general plane of the driving core but permits resilient movement in the perpendicular direction; to provide a simple, sturdy and reliable structure which can be readily taken apart by hand but the parts of which are prevented from being incorrectly reassembled to an operative whole realizing said objects, together with others hereinafter pointed out or flowing from the novel features of the mechanism.

In accordance with the preferred embodiment of the invention, there is provided a head in which the leaf spring carrier for the cup member of the bottom bearing is mounted and a sleeve effecting the connection of the bottom bearing with a supporting bar of the meter.

The aforementioned head and sleeve have fitting means which effect the result that the leaf spring carrier for the bottom bearing is permitted resilient movement in a predetermined direction while prevented from motion in other directions. In case of a temporary taking down and reassembling of the bottom bearing the fitting means of the head and sleeve prevent the reengagement of the parts of the bottom bearing in any position except the original.

In certain respects, the present invention is an improvement on the meter construction shown in the prior patent to Indergand 2,233,781, March 4, 1941.

The foregoing description and the following detailed description as well are exemplary and explanatory of the invention but are not restrictive thereof.

The accompanying drawings show by way of example the preferred embodiment of the present invention.

The cup member 6 of the bottom bearing receives the ball member (not shown) and is supported by a leaf spring 8 which is secured in the base of cup member 6 and also in a head 10. In the supporting bar or member 12 is fixed a sleeve 14 secured against turning, by means of nuts 15 and 16. The sleeve 14 and the parts introduced therein are prevented from turning away from the same angular position relatively to the core of the driving magnet of the meter (not shown) by means of a longitudinal slot 18 in the screw thread of the sleeve 14 and a rib 20 on the member 12, projecting into this slot. Cap 22 is threaded onto sleeve 14 which extends beyond the place of connection between it and the cap 22, i. e. beyond its threads by means of a tubular abutment 24. The sleeve 14 has two slots 26 and 28 arranged diametrically opposite to each other and extending down to the lower edge of the tubular abutment 24. Slot 26 extends for relatively much less distance in the longitudinal direction of the sleeve 14 than does slot 28. Head 10 has two projections 30 and 32 diametrically arranged to each other provided on its cylindrical exterior surface which projection 30 extends over only a short distance of the height of head 10, while projection 32 extends up the whole height of head 10. When projection 30 registers with slot 26 and consequently projection 32 registers with slot 28, the head 10 may be pushed into the sleeve 14 thereby allowing the cup member 6 to come into its correct position with the ball member thus permitting the rotation of the driving disc in the air gap of the driving magnet core. The cap 22 can then be screwed on to the sleeve 14 until it abuts against the tubular extension 24, securing through a spring 34 the head 10 in its position in the sleeve. By this arrangement the spring 34 provides an elastic support adapted to absorb any shocks that may occur and the tubular abutment 24 serves to define the position of the driving disc relatively to the air gap of the driving magnet core.

If, when assembling the bottom bearing, the head 10 be inadvertently displaced through 180° in the sleeve 14, projection 30 registers with slot 28 and projection 32 registers with slot 26, permitting head 10 to enter only partially into the sleeve 14. Even if spring 34 is completely compressed the thread of the cap 22 will not engage the thread of the sleeve 14 and thus assembling of the bottom bearing is prevented as shown in Figure 5.

The bearings of electricity meters are very sensitive and when they are once run in, should not be subject to any alteration in their relative positions, as, for example, during inspection. In the preferred embodiment the fitting devices prevent the cup member from ever reengaging the ball when the head is inserted incorrectly into the sleeve. By preventing operative reassembly of the bearing parts in any but the correct relation, possible injury to the delicate bearing parts is avoided.

The invention in its broader aspects is not limited to the specific mechanisms shown and described but departures may be made therefrom within the scope of the accompanying claims without departing from the principles of the invention and without sacrificing its chief advantages.

What is claimed is:

1. In a bottom bearing for electricity meters having a rotating spindle, a bearing cup and a ball, one of the two last parts being carried by one end of the spindle above the other part and a support for the other part, the combination of a sleeve, threadedly engaging a support bar of the meter, into which is inserted a head in which a leaf spring, supporting the bearing cup is mounted, said sleeve having diametrically opposed slots of different length and said head having diametrically opposed lugs interengaging with the slots and having lengths conforming to the length of said corresponding slots and limiting the axial and angular position of the head with respect to the sleeve.

2. A bottom bearing, of the character set forth in claim 1, having a cap engaging said sleeve and said sleeve having a tubular abutment extending beyond the place of connection between it and the cap whereby the movement of the cap on the sleeve is limited.

3. A bottom bearing of the character set forth in claim 1, having a cap nut threaded on the lower end of the sleeve for holding the head in place in the sleeve.

4. A bottom bearing of the character set forth in claim 1, having a cap threadedly engaging said sleeve, and a spring interposed between said cap and head and pressing the head inwardly within the sleeve and absorbing shocks which may occur.

JOSEF LIMBERGER.

REFERENCES CITED

The following references are of record in the file of this patent:

UNITED STATES PATENTS

| Number | Name | Date |
| --- | --- | --- |
| 1,088,839 | Pratt et al. | Mar. 3, 1914 |
| 2,233,781 | Indergand | Mar. 4, 1941 |

FOREIGN PATENTS

| Number | Country | Date |
| --- | --- | --- |
| 27,399 | Great Britain | 1904 |
| 49,623 | Switzerland | 1909 |
| 231,712 | Great Britain | 1925 |